Nov. 5, 1963 C. HOROWITZ ETAL 3,109,455
BRAKE SYSTEM CONTROL VALVE
Filed Jan. 23, 1961 3 Sheets-Sheet 1

INVENTORS.
CHARLES HOROWITZ
HAROLD L. DOBRIKIN
BY Parker & Carter
Attorneys.

INVENTORS.
CHARLES HOROWITZ
HAROLD L. DOBRIKIN
BY Parker & Carter
Attorneys.

INVENTOR.
CHARLES HOROWITZ
HAROLD L. DOBRIKIN
BY Parker & Carter
Attorneys.

3,109,455
BRAKE SYSTEM CONTROL VALVE
Charles Horowitz, Chicago, and Harold L. Dobrikin, Highland Park, Ill., assignors to Berg Airlectro Products Co., Chicago, Ill., a corporation of Illinois
Filed Jan. 23, 1961, Ser. No. 84,146
5 Claims. (Cl. 137—627.5)

This invention relates to control valves and has particular relation to a valve mountable on the dash of a tractor and effective to control elements of an air brake system such as that employed in tractor-trailer truck combinations.

One purpose of the invention is to provide a control valve for controlling a fluid pressure brake system having brake chambers for applying the brakes and spring-operated parking brake cylinders effective to operate slack adjuster elements in applying the brakes for parking and in the event of pressure loss in the system.

Another purpose is to provide a control valve as above described and having provisions effective to protect elements of the system with which it is associated, such as the slack adjuster mentioned, against excessive stress resulting from the application of the air pressure force of the system and the spring force of the auxiliary parking and emergency brake system.

Another purpose is to provide such a valve which shall automatically open to charge the system with which it is associated when the service pressure of such system has reached a predetermined level.

Another purpose is to provide such a valve which will automatically sever communication between the air reservoir of the system with which it is associated and the spring-operated parking and emergency brake element of such system when the pressure from said reservoir is diminished below a predetermined level and the service pressure of such system is at zero pressure.

Another purpose is to provide such a valve having provisions for manual operation.

Another purpose is to provide such a valve having provision for return to the system-charging position whenever service pressure in said system is above a predetermined level, even though said valve should be inadvertently manually moved toward the non-charging position.

Other purposes will appear from time to time in the course of the specification and claims.

Figure 1:
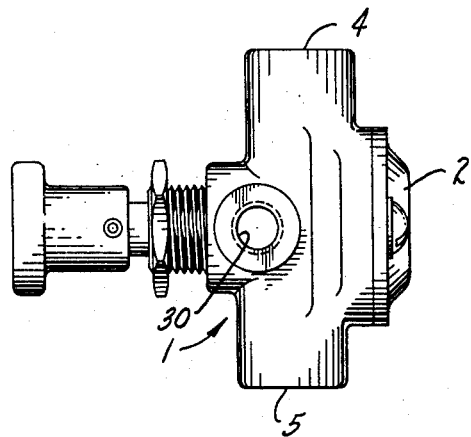
Figure 2:
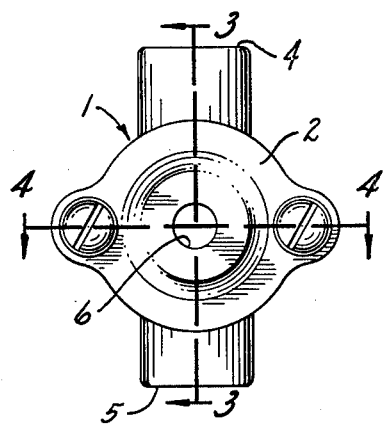
Figure 3:
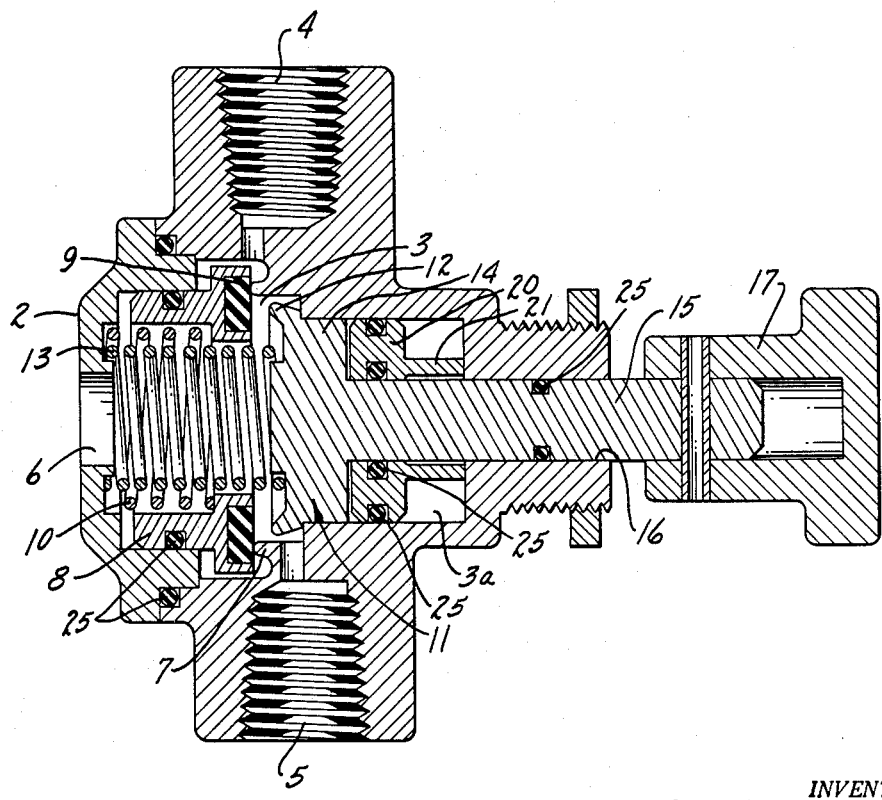
Figure 4:
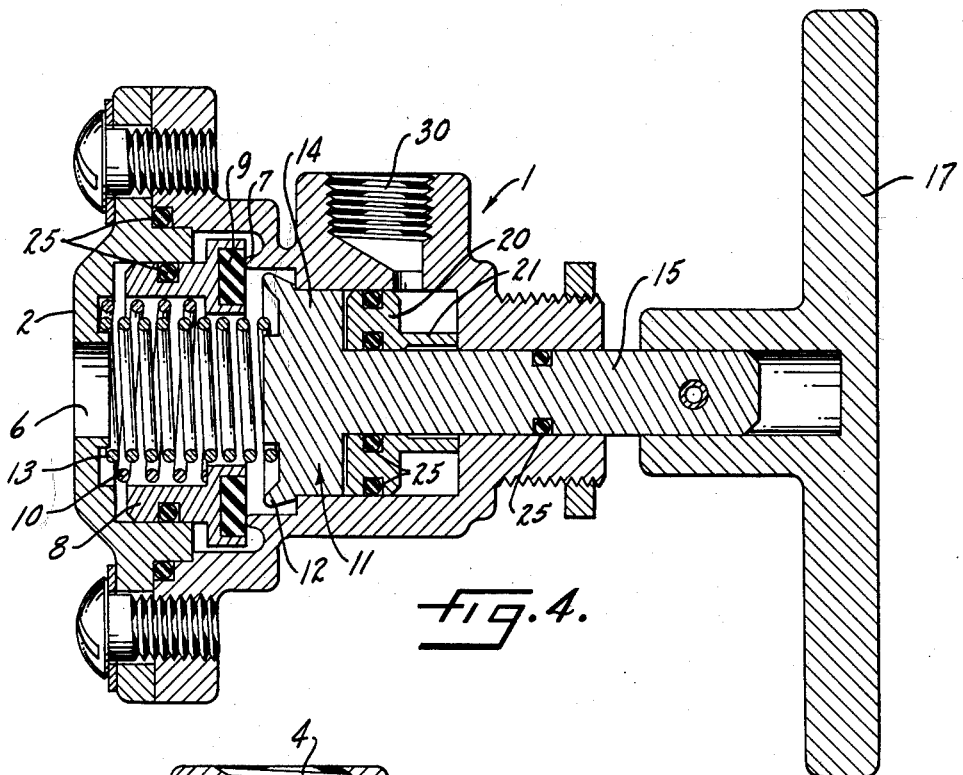
Figure 5:
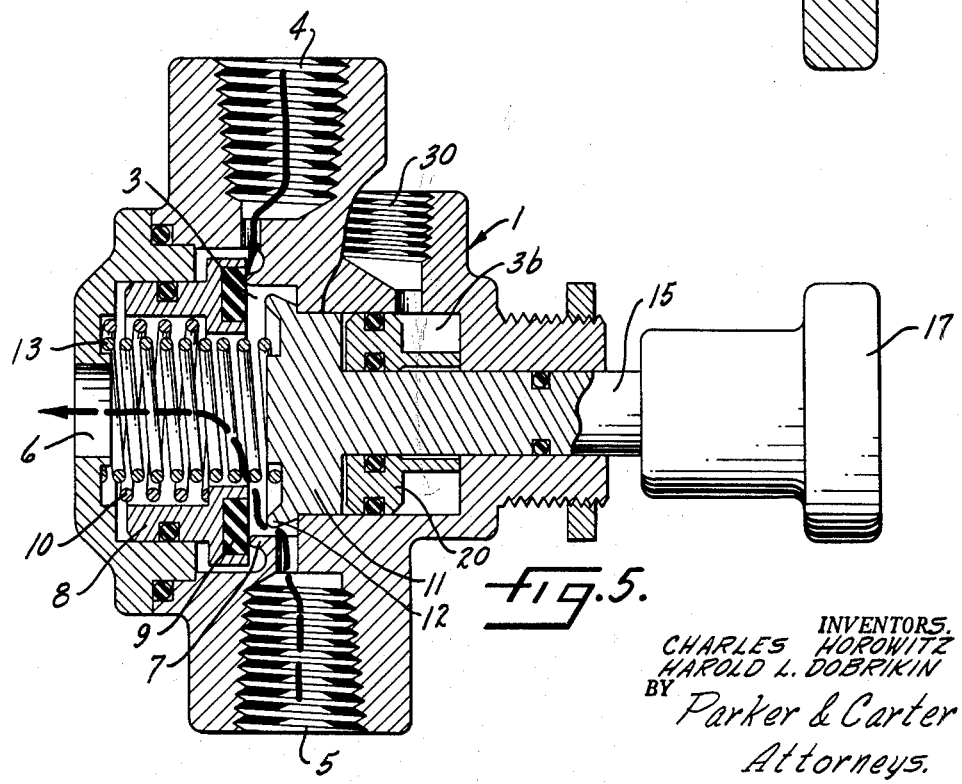
Figure 6:
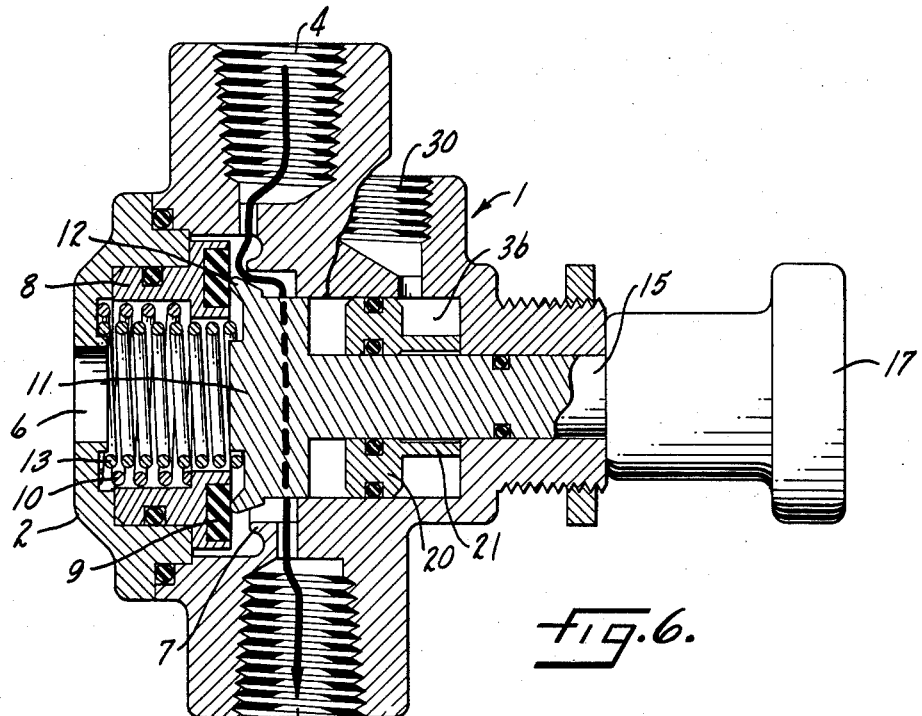
Figure 7:
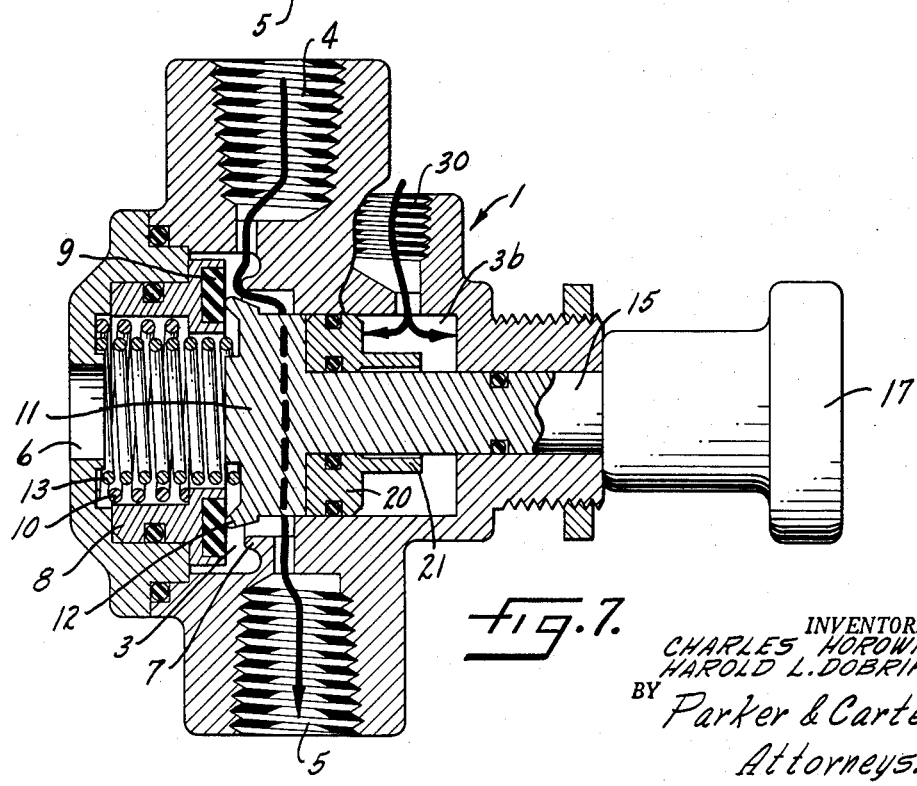

The invention is illustrated more or less diagrammatically in the accompanying drawings, wherein:
FIGURE 1 is a side elevation;
FIGURE 2 is an end view;
FIGURE 3 is a view in cross section taken on the line 3—3 of FIGURE 2 and on an enlarged scale;
FIGURE 4 is a view in cross section taken on the line 4—4 of FIGURE 2 and on an enlarged scale;
FIGURE 5 is a side elevation with parts broken away and parts in cross section;
FIGURE 6 is a view similar to that of FIGURE 5 with parts shown in another position; and
FIGURE 7 is a view similar to that of FIGURE 5 with parts shown in still another position.

Like parts are indicated by like numerals throughout the specification and drawings.

Referring now to the drawings, and particularly to FIGURE 1, the numeral 1 generally illustrates a valve housing. The housing 1 has a cavity therein closed by a cover 2.

As best seen in FIGURE 3, the cavity in housing 1 is indicated generally by the numeral 3. A pressure inlet 4 communicates with one side of said cavity, a pressure outlet 5 communicates with another portion of the cavity 3. The cap 2 has an exhaust outlet 6 communicating with another portion of the cavity 3. A circular valve seat 7 is formed in cavity 3 between inlet 4 and outlet 5. A cylindrical shuttle 8 is reciprocal in one end of cavity 3 and carries an annular valve face 9 positioned for seating on valve seat 7. Yielding means 10 has one of its ends exerted against the inner surface of cap 2 and its opposite end exerted against shuttle 8 to urge the valve face 9 toward seat 7. A reduced portion 3a of chamber 3 has reciprocally mounted therein a movable valve seat piston 11 carrying at its inner end a valve seat portion 12. Yielding means 13 has one of its ends exerted against the inner surface of cap 2 and its opposite end exerted against movable valve seat 12 to urge the same away from valve face 9. The member 11 has a reduced portion 14 in slidable engagement with the inner cylindrical surface of chamber 3a. The valve seat portion 12 at its point of juncture with the reduced portion 14, provides a limit stop abutment limiting the movement of valve seat 12 away from valve face 9 by contact with the abutment formed by the reduction of cavity 3 to form cavity portion 3a. The member 11 has integral therewith a shaft 15 extending from member 11 in a direction away from valve face 9 and through a bore 16 in housing 1 to a point outwardly thereof. The outer portion of shaft 15 carries manually operable handle member 17.

Slidable on shaft 15 within chamber 3a is a thrust piston 20. The piston 20 has a reduced sleeve portion or extension 21 extending along and about shaft 15 toward bore 16 and serving to limit the movement of piston 20 in a direction away from member 11.

Suitable seal members are provided between the cap 2 and housing 1, within a groove in the outer circumferential wall of shuttle 8 and in contact with the surrounding inner cylindrical surface of cap 2, and within grooves in piston 20 and in contact with the inner cylindrical surface of chamber 3a and the outer cylindrical surface of shaft 15, the said seals being indicated by the numeral 25.

As best seen in FIGURES 4 and 5, the housing 1 has a second pressure inlet 30 formed therein and communicating with cavity portion 3a at a point positioned beyond thrust piston 20 from member 11, and thus with the annular chamber 3b formed in cavity portion 3a by the inner cylindrical wall thereof and the rearward sleeve extension 21 of piston 20.

In FIGURES 5, 6 and 7 lines and arrows have been added in illustration of fluid pressure paths and effects in the valve of the invention and to aid in applying the description of the use and operation of the invention which follows.

The use and operation of the invention are as follows:
Fluid pressure is provided at inlet 4. As indicated by the arrow in the upper portion of FIGURE 5, said fluid pressure is delivered to one side of valve seat 7. With the valve face 9 seated thereon, the said pressure is precluded from passing through the valve of the invention.

To operate the valve, the operator may manually move the handle 17 toward housing 1 to move member 11 against valve face 9. When the movable valve seat 12 is continued against valve face 9, the said valve face may be moved, against the action of spring 10, off seat 7 to open communication between the inlet 4 and the outlet 5. It will be observed, as the parts are shown on the drawings, that pressure outlet 5 is in communication through cavity 3 and annular valve face 9 and springs 10, 13, with exhaust outlet 6. Upon contact of movable valve seat 12 with valve face 9, however, communication between pressure outlet 5 and exhaust outlet 6 is severed. The pressure entering inlet 4, when valve face 9 is in contact with movable valve seat 12 and out of contact with fixed valve seat 7, is active against the exposed portion of valve face 9 and the recessed rear portion of movable valve seat 12 to aid in retaining the valve in open position.

Pressure inlet 30 is provided for attachment to the service air system of, for example, a truck-trailer vehicle. Service pressure is delivered by inlet 30 to annular chamber 3b behind thrust piston 20. Upon delivery of sufficient pressure at inlet 30 it will be apparent that thrust piston 20 will be moved toward valve face 9 and will carry with it the movable valve seat 12 to unseat valve face 9 from fixed seat 7 and to maintain valve face 9 in contact with movable seat 12. Since thrust piston 20 is slidable on shaft 15, it will be further apparent that a failure or lack of service pressure at inlet 30, with the movable valve seat holding valve face 9 off its fixed seat 7, would merely permit thrust piston 20 to return to the position shown in FIGURES 3–5, while allowing the movable valve seat 12 to hold valve face 9 off its seat 7.

When it is desired to exhaust the system, the operator may merely retract, by means of handle 17, the member 11 toward the position illustrated in FIGURES 3–5. Once the valve face 9 is seated on its seat 7, the spring 13 is effective to urge member 11 to the position illustrated in FIGURES 3–5. Upon separation of movable valve seat 12 from valve face 9, and the contact of valve face 9 with fixed seat 7, an exhaust passage is opened from inlet 5 through cavity 3, springs 10, 13, and annular valve face 9 to exhaust outlet 6, to exhaust the system connected to outlet 5 to atmosphere.

It will be understood that an appropriate and suitable employment of the invention disclosed herein would envision the connection of a fluid pressure reservoir of a tractor-trailer fluid pressure system to the inlet 4, the connection of pressure outlet 5 to a spring-operated parking and emergency brake cylinder wherein such air would be delivered to one side of a piston in said cylinder to hold said parking and emergency brake against application, and to compress the spring in said cylinder on the opposite side of said piston, it being understood that a lack of air pressure in said parking and emergency brake cylinder enables the spring therein to apply the brakes. The inlet 30 is envisioned as being connected to a source of service pressure on said tractor-trailer combination vehicle. It will be further understood that the pressure outlet 5, in addition to being arranged for delivery of fluid pressure to one side of the piston in a parking and emergency brake cylinder, the said outlet 5 can be expected to be secured also to other elements in a fluid pressure brake system.

The supply of fluid pressure from outlet 5 to one side of a piston in a parking and emergency brake cylinder is effective to hold said piston in retracted position, and thus to protect the slack adjuster arranged for operation by said piston against the continuous application of the force of the spring in said cylinder while permitting said slack adjusted to be operated by the normal service brake system of the vehicle, and thus precluding the excessive stress upon the slack adjuster which would be produced by the two forces of the service system and the spring in said cylinder.

Similarly, should the operator for any reason fail to manually operate the handle 17 to charge the fluid pressure brake system of the vehicle, the service pressure in said system, when above a predetermined level, say, 80 p.s.i., is effective to automatically, through the mediacy of thrust piston 20, open the valve to charge the system. Further, should there be no pressure in the service system and, therefore, no pressure delivered to inlet 30 and thrust piston 20, the valve of the invention will automatically sever communication between a fluid pressure reservoir connected to inlet 4 and the parking and emergency brake cylinder whenever the pressure in the line from the air reservoir drops below a predetermined level, say, 38 p.s.i., at which point the springs 10, 13 are effective to return the parts to the position illustrated in FIGURE 5. Should such diminution of air reservoir pressure and lack of service pressure in the system occur, the parking and emergency brake cylinder will be exhausted through outlet 5 and exhaust outlet 6, as above described, causing an immediate application of the brakes of the vehicle through operation of the piston by the spring in the parking and emergency brake cylinder. Thus, the vehicle is brought to immediate halt upon diminution of the fluid pressure below an adequate safe level. Should the operator inadvertently retract handle 17 when adequate safe service pressure is available at inlet 30, it will be clear that such pressure will be automatically effective against thrust piston 20 to return the valve to the operating position shown in FIGURE 7, for example.

Whereas a preferred embodiment of the invention has been described and claimed, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

We claim:

1. In a control valve a housing, a fluid pressure inlet in said housing, a fluid pressure outlet in said housing, a fixed valve seat between said inlet and said outlet, a valve face yieldingly urged toward said fixed valve seat, a movable valve seat positioned for movement against said valve face and means for moving said movable valve seat, including a thrust piston positioned for reciprocation in said housing on the opposite side of said movable valve seat from said valve face, and a second fluid pressure inlet positioned in said housing to deliver fluid pressure to said thrust piston on the side thereof opposite from that opposed to said movable valve seat to move said piston into contact with said movable seat and to move said movable seat and piston toward said valve face, said last named means including a shaft secured to said movable valve seat and extending through said thrust piston to a point outwardly of said housing, and a handle secured to said shaft outwardly of said housing.

2. In a control valve a housing, a fluid pressure inlet in said housing, a fluid pressure outlet in said housing, a valve seat between said inlet and said outlet, a valve face yieldingly urged against said valve seat to close communication between said inlet and said outlet, a movable valve seat movable against said valve face to open communication between said inlet and said outlet, an exhaust outlet in said housing, said exhaust outlet being in communication with said pressure outlet through said valve face when said movable valve seat is away from said valve face, said exhaust outlet being sealed from communication with said pressure outlet when said movable valve seat is against said valve face, and alternate means for moving said movable valve seat against said valve face, said last named means including a shaft secured to said movable valve seat and extending outwardly of said housing, and a thrust piston slidably mounted on said shaft within said housing, a second pressure inlet positioned in said housing to deliver pressure against said thrust piston to urge said piston against said movable valve seat in a direction toward said valve face and to urge said piston and movable valve seat toward said valve face.

3. For use with a vehicle brake system having an emergency fluid pressure reservoir, a service pressure reservoir and a brake cylinder having spring-operated and pressure-retarded brake operating means, a dash control valve including a housing, a first pressure inlet adapted for communication with said emergency pressure reservoir, a pressure outlet adapted for communication with said brake cylinder, a fixed valve seat between said inlet and outlet, a valve face, a spring urging said valve face into contact with said fixed seat, an exhaust passage communicating with said outlet when said valve face is on said fixed seat, a movable valve seat movable through said fixed seat upon said valve face and to seal said exhaust outlet from communication with said pressure outlet, and means for moving said movable valve seat comprising a shaft secured to said movable valve seat and extending through and outwardly of said housing, a handle on said shaft outwardly of said housing, a thrust piston slidable on said shaft within said housing, a second fluid pressure inlet adapted for communication with said service reservoir and positioned in said housing to deliver fluid pressure from said service reservoir to one side of said thrust piston to urge said thrust piston against said movable valve seat and to urge said movable valve seat and thrust piston toward said valve face.

4. For use with a vehicle brake system having an emergency fluid pressure reservoir, a service pressure reservoir and a brake cylinder having spring-operated and pressure-retarded brake operating means, a dash control valve including a housing, a first pressure inlet adapted for communication with said emergency pressure reservoir, a pressure outlet adapted for communication with said brake cylinder, a fixed valve seat between said inlet and outlet, a valve face, a spring urging said valve face into contact with said fixed seat, an exhaust passage communicating with said outlet when said valve face is on said fixed seat, a movable valve seat movable through said fixed seat to seat upon said valve face and to seal said exhaust outlet from communication with said pressure outlet, and means for moving said movable valve seat comprising a shaft secured to said movable valve seat and extending through and outwardly of said housing, a handle on said shaft outwardly of said housing, a thrust piston slidable on said shaft within said housing, a second fluid pressure inlet adapted for communication with said service reservoir and positioned in said housing to deliver fluid pressure from said service reservoir to one side of said thrust piston to urge said thrust piston against said movable valve seat and to urge said movable valve seat and thrust piston toward said valve face, said movable seat being manually operable in opposite directions, said thrust piston being movable in one direction in response to entry of fluid pressure through said second inlet, said thrust piston being movable in the opposite direction in response to manual movement of said movable seat in said opposite direction.

5. For use in a vehicle brake system having a first pressure reservoir and a second pressure reservoir, a dash control valve comprising a housing, a first fluid pressure inlet in said housing adapted for communication with said first reservoir, a pressure outlet in said housing, a valve structure controlling communication between said first inlet and said outlet, and means for moving said valve structure, said means including a movable valve seat member slidable in said housing and movable against said valve structure, said movable valve seat member including a shaft slidably mounted in said housing and extending outwardly therefrom, a handle secured to said shaft outwardly of said housing, a thrust piston slidably mounted in said housing and on said shaft, a second fluid pressure inlet in said housing adapted for communication with said second reservoir and positioned in said housing to deliver fluid pressure to one side of said thrust to urge the same into contact with said movable seat member and to urge said piston and seat member toward said valve structure, said movable seat member being manually movable toward and away from said valve structure independently of any movement of said thrust piston, said thrust piston being movable against the action of fluid pressure entering said second inlet in response to manual movement of said movable seat member away from said valve structure.

References Cited in the file of this patent

UNITED STATES PATENTS

| | | |
|---|---|---|
| 620,287 | Donnelly | Feb. 28, 1899 |
| 1,669,280 | Blair et al. | May 8, 1928 |
| 1,921,092 | Newton | Aug. 8, 1933 |
| 2,470,746 | Schultz | May 17, 1946 |
| 2,534,509 | Franck | Dec. 19, 1950 |
| 2,587,404 | Stelzer | Feb. 26, 1952 |
| 2,683,621 | Boyer | July 13, 1954 |
| 2,717,003 | Jay et al. | Sept. 6, 1955 |
| 2,783,020 | Kleczek | Feb. 26, 1957 |
| 2,839,264 | Trubert | June 17, 1958 |
| 2,896,664 | Lieser | July 28, 1959 |
| 2,896,665 | Lieser | July 28, 1959 |
| 2,923,576 | Seale | Feb. 2, 1960 |
| 2,985,143 | Stelzer | May 23, 1961 |
| 2,991,801 | Larsson | July 11, 1961 |
| 3,042,061 | Dobrikin | July 3, 1962 |
| 3,049,099 | Price | Aug. 14, 1962 |

FOREIGN PATENTS

| | | |
|---|---|---|
| 949,326 | Germany | Sept. 20, 1956 |
| 1,238,932 | France | July 11, 1960 |